(12) United States Patent
He et al.

(10) Patent No.: US 12,285,918 B2
(45) Date of Patent: Apr. 29, 2025

(54) PRINTING DEVICE AND PRINTING METHOD

(71) Applicant: Qingdao University of Science and Technology, Qingdao (CN)

(72) Inventors: Yan He, Qingdao (CN); Dianming Chu, Qingdao (CN); Wenjuan Bai, Qingdao (CN)

(73) Assignee: Qingdao University of Science and Technology, Qingdao (CN)

( * ) Notice: Subject to any disclaimer, the term of this patent is extended or adjusted under 35 U.S.C. 154(b) by 0 days.

(21) Appl. No.: 18/121,031

(22) Filed: Apr. 13, 2023

(65) Prior Publication Data

US 2023/0241840 A1 Aug. 3, 2023

Related U.S. Application Data

(63) Continuation of application No. PCT/CN2021/092675, filed on May 10, 2021.

(30) Foreign Application Priority Data

Apr. 16, 2021 (CN) .......................... 202110410084.6

(51) Int. Cl.
| | | |
|---|---|---|
| *B33Y 10/00* | (2015.01) | |
| *B29C 64/10* | (2017.01) | |
| *B29C 64/393* | (2017.01) | |
| *B33Y 50/02* | (2015.01) | |
| *B33Y 70/10* | (2020.01) | |

(52) U.S. Cl.
CPC ............ *B29C 64/393* (2017.08); *B29C 64/10* (2017.08); *B33Y 10/00* (2014.12); *B33Y 50/02* (2014.12); *B33Y 70/10* (2020.01)

(58) Field of Classification Search
None
See application file for complete search history.

(56) References Cited

U.S. PATENT DOCUMENTS

| | | | | |
|---|---|---|---|---|
| 2015/0321417 A1* | 11/2015 | Mironets | ................. | B23P 15/00 |
| | | | | 156/263 |
| 2017/0129170 A1* | 5/2017 | Kim | ...................... | B29C 64/106 |
| 2017/0129182 A1* | 5/2017 | Sauti | ...................... | B29C 64/30 |

(Continued)

FOREIGN PATENT DOCUMENTS

| | | |
|---|---|---|
| CN | 104526171 A | 4/2015 |
| CN | 105880598 A | 8/2016 |

(Continued)

OTHER PUBLICATIONS

ISR of PCT/CN2021/092675.

(Continued)

*Primary Examiner* — Yung-Sheng M Tsui

(57) ABSTRACT

The present invention relates to a printing device and a printing method. The combination mode between materials in an additive manufacturing process is improved. A calculation unit is used for controlling an A pole unit and a B pole unit to be in contact with the materials, to form an energized circuit. The surface temperature of phase change material in the material between the A pole unit and the B pole unit is greater than or equal to a preset temperature so that the materials at a distance can be simultaneously combined.

1 Claim, 2 Drawing Sheets

(56) References Cited

U.S. PATENT DOCUMENTS

| | | | |
|---|---|---|---|
| 2018/0072001 A1 | 3/2018 | Swartz et al. | |
| 2018/0141274 A1 | 5/2018 | Fink et al. | |
| 2019/0143565 A1* | 5/2019 | Mohanty | C22C 47/06 |
| | | | 264/257 |
| 2021/0328130 A1* | 10/2021 | Wang | B29C 70/62 |
| 2022/0168968 A1* | 6/2022 | Kurihara | B29C 39/42 |
| 2022/0305727 A1* | 9/2022 | Yourdkhani | B33Y 80/00 |

FOREIGN PATENT DOCUMENTS

| | | |
|---|---|---|
| CN | 108356270 A | 8/2018 |
| CN | 108436084 A | 8/2018 |
| CN | 112590196 A | 4/2021 |
| DE | 102018127931 A | 5/2020 |

OTHER PUBLICATIONS

Guo et al. "Thermal performance of a 3D printed lattice-structure heat sink packaging phase change material" Chinese Journal of Aeronautics, (2021), 34(5): 373-385. Available online Aug. 15, 2020.

Wei et al. "Thermal energy regulation with 3D printed polymer-phase change material composites" Matter 4, 1975-1989, Jun. 2, 2021.

Pandis et al. "Differential scanning calorimetry based evaluation of 3D printed PLA for phase change materials encapsulation or as container material of heat storage tanks" 2nd International Conference on Sustainable Energy and Resource Use in Food Chains, ICSEF 2018, Oct. 17-19, 2018.

Yazdani et al. Efficient storage and recovery of waste heat by phase change material embedded within additively manufactured grid heat exchangers International Journal of Heat and Mass Transfer 181 (2021) 121846.

Qureshi et al. "Thermal characterization of 3D-Printed lattices based on triply periodic minimal surfaces embedded with organic phase change material" Case Studies in Thermal Engineering 27 (2021) 101315.

Liu et al. "Advanced 3D-printed phase change materials". Matter 4, 3372-3384, Nov. 3, 2021.

Maier, M., Salazar, B., Unluer, C., Taylor, H. K. and Ostertag, C. P. (2021) Thermal and mechanical performance of a novel 3D printed macro-encapsulation method for phase change materials. Journal of Building Engineering, 43, 103124.

Yang et al. "Bean-Pod-Inspired 3D-Printed Phase Change Microlattices for Solar-Thermal Energy Harvesting and Storage" Small 2021, 17, 2101093.

Cao et al. "The Enhanced Performance of Phase-Change Materials via 3D Printing with Prickly Aluminum Honeycomb for Thermal Management of Ternary Lithium Batteries". Advances in Materials Science and Engineering vol. 2020, Article ID 8167386, 11 pages.

Nofal et al. "Thermal management of lithium-ion battery cells using 3D printed phase change composites" Applied Thermal Engineering 171 (2020) 115126.

Abedi et al. "Evaluation of electromagnetic shielding properties of high-performance continuous carbon fiber composites fabricated by robotic 3D printing" Additive Manufacturing 54 (2022) 102733.

Luhrs et al. "Fabrication of a Low Density Carbon Fiber Foam and Its Characterization as a Strain Gauge". Materials 2014, 7, 3699-3714.

Huang et al. "3D printing of carbon fiber-filled conductive silicon rubber". School of Materials Science & Engineering, Beijing University of Technology, Beijing 100124, China. Materials & Design. 2017.

Shi et al. "Dynamic Capillary-Driven Additive Manufacturing of Continuous Carbon Fiber Composite"; Matter 2, 1-11, Jun. 3, 2020.

* cited by examiner

Controlling at least one electrode couple to be in contact with the material during material discharge to the forming of a printed object, to form an energized circuit;

S1

Using the energized circuit for energizing and heating the material, and making the surface temperature of at least the phase change material in the material greater than or equal to preset temperature, so that the material is combined until the printed object is obtained.

PRINTING DEVICE AND PRINTING METHOD

TECHNICAL FIELD

The present invention relates to the technical field of additive manufacturing, and more particularly to a printing device and a printing method.

BACKGROUND

Additive manufacturing technology is widely used in the strategic and livelihood fields of aerospace, automobiles, medical treatment and military affairs because of its advantages of customization, complex structure of printed products and material saving. However, the existing additive manufacturing processes apply energy to points to combine the materials, which has the problem of uneven energy.

Based on this, a printing device and a printing method capable of improving uniformity of energy are urgently needed.

SUMMARY

The purpose of the present invention is to provide a printing device and a printing method, so as to improve uniformity of energy in the additive manufacturing processes.

To achieve the above purpose, the present invention provides the following solution:

A printing device is provided. The printing device comprises a calculation unit and at least one electrode couple.

The calculation unit is connected with the electrode couple; the electrode couple comprises an A pole unit and a B pole unit, and the A pole unit has an opposite polarity to the B pole unit.

The calculation unit is used for controlling the electrode couple to be in contact with the material during material discharge to the forming of a printed object, to form an energized circuit; the material is a phase change conductive material, or the material comprises a phase change material and a conductive material.

The energized circuit is used for energizing and heating the material, and the surface temperature of at least the phase change material in the material is greater than or equal to preset temperature, so that the material is combined until the printed object is obtained.

A printing method is provided. The printing method comprises:

controlling at least one electrode couple to be in contact with the material during material discharge to the forming of a printed object, to form an energized circuit, wherein the material is a phase change conductive material, or the material comprises a phase change material and a conductive material;

using the energized circuit for energizing and heating the material, and making the surface temperature of at least the phase change material in the material greater than or equal to preset temperature, so that the material is combined until the printed object is obtained.

According to specific embodiments provided by the present invention, the present invention discloses the following technical effects:

In the printing device and the printing method provided by the present invention, the combination mode between the materials is improved in the additive manufacturing process, and the calculation unit controls at least one electrode couple to be in contact with the materials during material discharge to the forming of the printed object, to form the energized circuit. The energized circuit is used for energizing and heating the material, and making the surface temperature of at least the phase change material in the material greater than or equal to preset temperature, so that the material is combined until the printed object is obtained. In addition, the materials at a distance can be simultaneously combined. Compared with the method of the prior art which uses laser beam, electron beam, plasma or ion beam as heat source for heating the materials to combine the materials and directly manufacture parts, the present invention can significantly improve the uniformity of energy in the additive manufacturing process. In addition, the materials at a distance are simultaneously combined, so that the obtained printed object can be mixed more evenly, thereby significantly improving the compactness of the final printed object.

DESCRIPTION OF DRAWINGS

To more clearly describe the technical solutions in the embodiments of the present invention or in prior art, the drawings required to be used in the embodiments will be simply presented below. Apparently, the drawings in the following description are merely some embodiments of the present invention, and for those skilled in the art, other drawings can also be obtained according to these drawings without contributing creative labor.

FIG. 2 is a flow chart of a printing method provided in embodiment 2 of the present invention.

REFERENCE SIGNS

Figure 1:
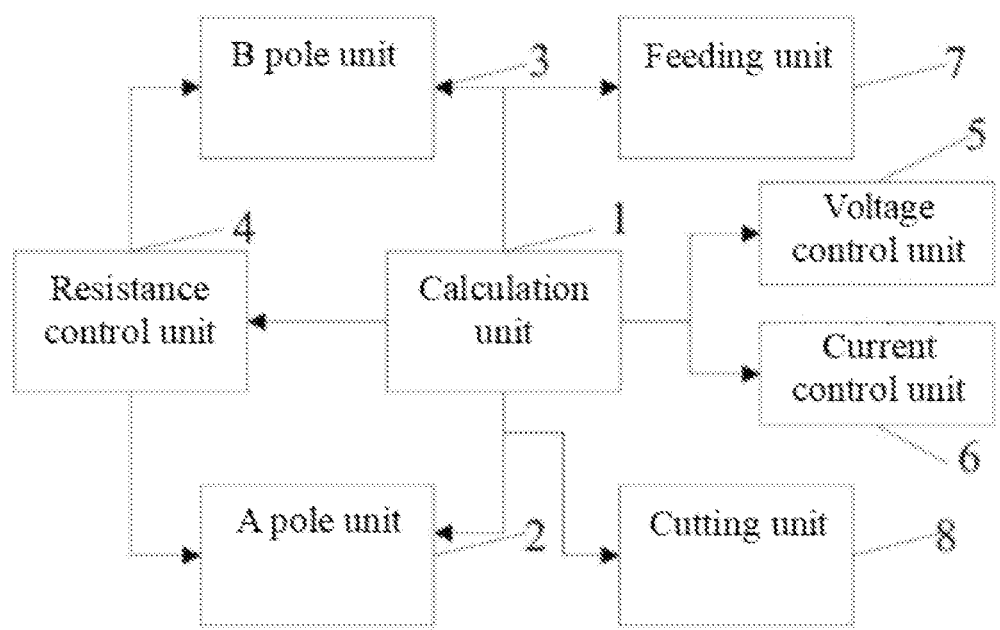
FIG. 1 is a structural schematic diagram of a printing device provided in embodiment 1 of the present invention.

1—calculation unit; 2—A pole unit; 3—B pole unit; 4—resistance control unit; 5—voltage control unit; 6—current control unit; 7—feeding unit; 8—cutting unit.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The purpose of the present invention is to provide a printing device and a printing method, so as to improve uniformity of energy in the additive manufacturing processes.

To make the above-mentioned purpose, features and advantages of the present invention more clear and understandable, the present invention will be further described below in detail in combination with the drawings and specific embodiments.

Embodiment 1

By referring to FIG. 1, the present embodiment is used for providing a printing device. The printing device comprises a calculation unit 1 and at least one electrode couple. The electrode couple comprises an A pole unit 2 and a B pole unit 3.

The calculation unit is connected with the electrode couple, i.e., the calculation unit 1 is indirectly connected with the A pole unit 2 and the B pole unit 3 respectively. Specifically, the calculation unit 1 is connected with the A pole unit 2 and the B pole unit 3 through a power supply. The calculation unit 1 controls the power supply to enable the A pole unit 2 and the B pole unit 3 to power the materials. The A pole unit 2 is a positive electrode or a negative pole of the power supply, while the polarity of the B pole unit 3 is opposite to that of the A pole unit 2. When the A pole unit 2 is the positive pole, the B pole unit 3 is the negative pole; and when the A pole unit 2 is the negative pole, the B pole unit 3 is the positive pole.

The calculation unit 1 is used for controlling the A pole unit 2 and the B pole unit 3 to be in contact with the material during material discharge to the forming of a printed object, to form an energized circuit. The material is a phase change conductive material, or the material comprises a phase change material and a conductive material. The energized circuit is used for energizing and heating the material between the A pole unit 2 and the B pole unit 3, and the surface temperature of at least the phase change material in the material is greater than or equal to preset temperature, until the materials are combined. The preset temperature is less than the phase change temperature of the phase change material in the material, but the difference between the preset temperature and the phase change temperature is less than a small value. The preset temperature can be considered to be close to the phase change temperature of the phase change material. Because the A pole unit 2 and the B pole unit 3 have opposite polarities and the materials comprise the conductive material, a current path can be formed among the A pole unit 2, the material and the B pole unit 3. Under the action of the current, the material located between the A pole unit 2 and the B pole unit 3 will generate heat. The heat generated at least makes the surface temperature of the phase change material in the material greater than or equal to the preset temperature so that part or all of the phase change materials in the material can approach phase change or can conduct phase change, so that the materials are combined. Until the printed object is obtained, all the materials for the printed object are combined.

It should be noted that the printing device in the present embodiment can be used not only in the additive manufacturing process of three-dimensional objects, but also in the additive manufacturing process of two-dimensional objects. The material between the A pole unit 2 and the B pole unit 3 is part of the material required by an object to be printed or all the material required by the object to be printed. Regardless of the 3D object or a 2D object, the material can be considered as an object with a certain length. Then the printing device provided in the present embodiment can make the material required by the object to be printed reach the preset temperature section by section to obtain the printed object. The A pole unit 2 and the B pole unit 3 can also be connected to the head and the tail of all the materials required by the object to be printed respectively, and all the materials are energized simultaneously. The surface temperature of at least the phase change material in all the materials reaches the preset temperature, to obtain the printed object. When energizing in sections, the present embodiment does not limit the length of each energized material and the sequential location of the energized material. Regardless of energizing in sections or entire energizing, the surface temperature of at least the phase change material in the material required by the object to be printed needs to reach the preset temperature to obtain the printed object.

In addition, the propagation velocity of an electric field in the conductive material is equal to the propagation velocity of an electromagnetic wave. According to Maxwell's electromagnetic theory, the electromagnetic wave travels at the speed of light, $3\times10^8$ m/s. Therefore, the propagation speed of the current between the A pole unit 2 and the B pole unit 3 is very short, equivalent to an instant, so the influence of the propagation time of the current on the change time of material temperature can be ignored.

The material used in the present embodiment can be the conductive material that is capable of conducting phase change or the phase change material that is capable of conducting electricity. At this moment, the material is a single material, such as a wire. Of course, the material used in the present embodiment may also comprise the conductive material and the phase change material. At this moment, the material is composite material. The combination mode can be a mixture of solid conductive material and solid phase change material, such as carbon fiber reinforced polyether ether ketone, carbon nanotube fiber reinforced polyether ether ketone. The phase change material and the conductive material can be intertwined, and can also be evenly distributed, or the conductive material can wrap the phase change material. The combination mode can also be that the solid phase change material is coated with the conductive material, for example, the surface of polymer material such as PLA (polylactic acid) or ABS (plastic) is coated with the conductive material which comprises metal particles, electrolyte solution and conductive glue. The combination mode can also be that the outer surface of the solid conductive material is coated with liquid phase change material, for example, the carbon fiber is coated with liquid epoxy resin. The conductive materials are non-insulators with a certain resistance value, including metal materials and non-metallic materials. The non-metallic materials can be specifically selected from polymer materials which can include carbon fibers, carbon nanotube fibers and other materials. The metal comprises aluminum, stainless steel and other materials. The phase change material is the material that can conduct phase change under certain temperature conditions.

In addition, the present embodiment does not limit the types and the quantity of the types of the conductive materials and the phase change materials contained in the material. The materials may include a variety of conductive materials and a variety of phase change materials at the same time. Of course, the materials may also include phase change conductive materials, phase change materials and conductive materials at the same time. It is only necessary to ensure that the materials include at least one conductive material and include at least one phase change material. The present embodiment also does not limit the cross section shapes of the conductive materials and the phase change materials.

In the additive manufacturing process of the prior art, when the materials are combined, laser beam, electron beam, plasma or ion beam is generally used as the heat source for heating the materials to combine the materials. This combination mode requires laser and other expensive equipment, complex structure and high cost, and the combination is realized in the way of points so that the energy is uneven. The printing device provided in the present embodiment heats the conductive materials in the materials according to the principle of electrothermal phase change, so that the phase change material in the materials approaches phase change or conducts phase change to realize the combination between the materials, thereby significantly improving the uniformity of energy in the printing process and providing a new printing principle for the additive manufacturing process. The printing device used in the present embodiment improves the combination mode between the materials in the additive manufacturing process. The calculation unit 1 is used for controlling the A pole unit 2 and the B pole unit 3 to be in contact with the material, to form an energized circuit. The surface temperature of the phase change material in the material between the A pole unit 2 and the B pole unit 3 is greater than or equal to the preset temperature so that the materials at a distance can simultaneously approach phase change or can conduct phase change, so that the materials are combined. The structure is simple and the cost is low, and the uniformity of energy in the additive manufacturing process can be improved. In addition, the materials at a distance simultaneously approach phase change or conduct phase change so that the obtained printed object can be mixed more evenly, thereby significantly improving the compactness of the final printed object.

The printing device in the present embodiment can also comprise a plurality of electrode couples, which can simultaneously energize and heat multiple sections of materials, thereby significantly increasing the printing speed. To further improve the compactness, the printing device in the present embodiment can also comprise a pinch roller. After the temperature of the material is greater than or equal to the preset temperature, the pinch roller is used for further compacting the material.

Here, the principle of phase change used in the present embodiment is explained:

According to Joule's law, the principle that the materials generate heat from electric energy can be expressed by the following formula:

$$Q = \frac{U^2}{R}t = I^2 Rt; \tag{1}$$

In formula 1, Q is the heat generated by the conductive material; U is the voltage between the A pole unit 2 and the B pole unit 3; R is the resistance between the A pole unit 2 and the B pole unit 3; I is the current between the A pole unit 2 and the B pole unit 3; and t is power supply time.

The formula of the relationship between the heat generated by the material and the temperature of the material is as follows:

$$Q = CM(t2-t1); \tag{2}$$

In formula 2, C is the specific heat of the conductive material; M is the mass of the conductive material between the A pole unit 2 and the B pole unit 3; t2 is the final temperature of the conductive material; and t1 is the initial temperature of the conductive material.

The calculation formula of the resistance is:

$$R = \rho \frac{L}{S}; \tag{3}$$

In formula 3, $\rho$ is the resistivity of the conductive material, which is determined by the property of the conductive material; L is the length of the conductive material between the A pole unit 2 and the B pole unit 3, which is equal to the distance between the A pole unit 2 and the B pole unit 3; and S is the cross sectional area of the conductive material between the A pole unit 2 and the B pole unit 3.

Regardless of single material or composite material, the phase change material and the conductive material are mixed. Thus, when the final temperature of the conductive material is greater than or equal to the preset temperature, the phase change material may approach phase change or conduct phase change. It should be noted that in formulas 1, 2 and 3, after the types of the conductive materials and the phase change materials in the materials are determined, the specific heat of the conductive materials, the resistivity of the conductive materials, the final temperature of the conductive materials and the initial temperature of the conductive materials are fixed values, and other parameters are adjustable parameters. The resistance value between the A pole unit 2 and the B pole unit 3 and the mass of the conductive material between the A pole unit 2 and the B pole unit 3 are determined by the distance between the A pole unit 2 and the B pole unit 3 and the cross-sectional area of the conductive material between the A pole unit 2 and the B pole unit 3, and thus, the adjustable parameters in the phase change process are the distance between the A pole unit 2 and the B pole unit 3, the voltage between the A pole unit 2 and the B pole unit 3, the current between the A pole unit 2 and the B pole unit 3, the cross-sectional area of the conductive material between the A pole unit 2 and the B pole unit 3, and the power supply time.

Based on the above formulas 1, 2 and 3, the present embodiment can also adjust the printing speed by adjusting the voltage value between the A pole unit 2 and the B pole unit 3 and/or adjusting the resistance between the A pole unit 2 and the B pole unit 3, or by adjusting the current value between the A pole unit 2 and the B pole unit 3 and/or adjusting the resistance between the A pole unit 2 and the B pole unit 3. The adjustment of the resistance between the A pole unit 2 and the B pole unit 3 is achieved by adjusting the distance between the A pole unit 2 and the B pole unit 3 and/or adjusting the cross-sectional area of the conductive material between the A pole unit 2 and the B pole unit 3.

The calculation formula of the mass of the conductive materials is:

$$M = \rho'LS; \tag{4}$$

In formula 4, $\rho'$ is the density of the conductive material between the A pole unit 2 and the B pole unit 3.

In combination with formula 1 to formula 4, the final formula is:

$$c\rho\rho'(t_2 - t_1) = \frac{(U)_2 t}{L} \tag{5}$$

It can be known according to formula 5 that at constant time t, when L is doubled, the voltage U is in direct proportion to L and is also doubled. Therefore, if the volume Δ of the material consumed by the printed object is constant, Δ=ST, T=L*n, (L is used to divide the total length Γ into n segments), and the cross-sectional area S is constant; when L is doubled and U is doubled, the printing speed of each segment is doubled by L=v*τ, and then the speed of printing the whole length Γ is doubled.

It is assumed that the phase change material is the same as the conductive material, such as a wire. If the cross-sectional area is constant, when the distance L between an A pole module and a B pole module is doubled and the voltage U is doubled, then the printing speed is doubled when the same object is printed. When the objects of the same volume Δ are printed, a circular or square cross-sectional area of the material is taken as an example. When the radius or side length is doubled, the cross-sectional area S is increased by 4 times. According to Δ=SΓ, Γ is decreased by 4 times. Therefore, under the condition that the voltage U is constant and the distance L is constant, the printing speed v is not increased according to L=v*τ, but the printing time is shortened by 4 times because the whole Γ is decreased by 4 times. It is assumed that the phase change materials and the conductive materials are uniformly distributed, such as carbon fibers and polyether ether ketone fibers or composites containing a certain proportion of carbon nanotubes. The materials can be equivalent to conductive phase change materials. In this case, the time is also shortened by 4 times.

Based on the above principle, the printing device in the present embodiment can comprise a resistance control unit 4 for changing the resistance, a voltage control unit 5 for changing the voltage and/or a current control unit 6 for changing the current.

The printing device further comprises a resistance control unit 4. The resistance control unit 4 is communicatively connected with the calculation unit 1, and the resistance control unit 4 is movably connected with the A pole unit 2 and the B pole unit 3 respectively. The A pole unit 2 can be in sliding connection or rolling connection with the resistance control unit 4, and the B pole unit 3 can be in sliding connection or rolling connection with resistance control unit 4.

The calculation unit 1 is also used for adjusting the resistance between the A pole unit 2 and the B pole unit 3 by controlling the resistance control unit 4. Specifically, the resistance control unit 4 adjusts the resistance between the A pole unit 2 and the B pole unit 3 by adjusting the distance between the A pole unit 2 and the B pole unit 3. The resistance control unit 4 can also be connected with a feeding unit 7. The cross-sectional area of the conductive material in the material supplied by the feeding unit 7 is adjusted to adjust the resistance between the A pole unit 2 and the B pole unit 3.

As an optional embodiment, when the distance between the A pole unit 2 and the B pole unit 3 is adjusted, the adjustment mode of the resistance control unit 4 comprises mechanical adjustment, electromagnetic adjustment, hydraulic adjustment and pneumatic adjustment. Mechanical adjustment means that mechanical structures, such as screw rods or worms or other mechanical linear motion mechanisms, are used to achieve the change in the distance between the A pole unit 2 and the B pole unit 3. Electromagnetic adjustment means that the change in the distance between the A pole unit 2 and the B pole unit 3 is achieved by the magnetic change according to the electromagnetic principle. Hydraulic adjustment means that the change in the distance between the A pole unit 2 and the B pole unit 3 is achieved according to the hydraulic principle such as the effect of the hydraulic cylinder. Pneumatic adjustment means that the change in the distance between the A pole unit 2 and the B pole unit 3 is achieved according to the pneumatic principle such as the effect of a cylinder. Those skilled in the art should understand that adjustment modes of other forms can also be used, and the present embodiment does not limit the specific type of the adjustment modes. It should be noted that when the distance is changed, only the position of the A pole unit 2 is adjusted, or only the position of the B pole unit 3 is adjusted, or the positions of the A pole unit 2 and the B pole unit 3 are adjusted simultaneously, as long as the distance between the A pole unit 2 and the B pole unit 3 can be adjusted.

And/or, the printing device further comprises a voltage control unit 5. The voltage control unit 5 is communicatively connected with the calculation unit 1, and the voltage control unit 5 is connected with the A pole unit 2 or the B pole unit 3. The calculation unit 1 is also used for adjusting the voltage between the A pole unit 2 and the B pole unit 3 by controlling the voltage control unit 5.

Specifically, the voltage control unit 5 comprises a first on-off unit and/or a voltage regulation unit. The first on-off unit is used for controlling the on-off of the voltage between the A pole unit 2 and the B pole unit 3, such as a relay. The voltage regulation unit is used for controlling the size of the voltage between the A pole unit 2 and the B pole unit 3, such as a voltage regulator.

And/or, the printing device further comprises a current control unit 6. The current control unit 6 is communicatively connected with the calculation unit 1, and the current control unit 6 is connected with the A pole unit 2 or the B pole unit 3. The calculation unit 1 is also used for adjusting the current between the A pole unit 2 and the B pole unit 3 by controlling the current control unit 6.

Specifically, the current control unit 6 comprises a second on-off unit and/or a current regulation unit. The second on-off unit is used for controlling the on-off of the current between the A pole unit 2 and the B pole unit 3, such as a circuit breaker. The current regulation unit is used for controlling the size of the current between the A pole unit 2 and the B pole unit 3, such as a current regulator.

In the present embodiment, the printing speed in the printing process can be adjusted by arranging the resistance control unit 4 for changing the resistance, the voltage control unit 5 for changing the voltage and/or the current control unit 6 for changing the current, so as to better meet the printing needs of users.

When the cross-sectional area of the material is small relative to the length of the material, if the conductive material in the material reaches the preset temperature, all the phase change materials can be melted or phase-changed instantaneously. At this moment, all the phase change materials reach the preset temperature. When the cross-sectional area of the material is large, if the conductive material in the material reaches the preset temperature, all the phase change materials cannot reach the preset temperature. In the present embodiment, the relationship between the radial phase change rate and the power supply time of the phase change materials is adjusted by adjusting the current, the voltage and the resistance, so as to adjust the phase change rate of the phase change materials.

As an optional embodiment, the shape and the size of the A pole unit 2 and the B pole unit 3 are arbitrary. A contact mode between the A pole unit 2 and the material is point contact, line contact or surface contact. A contact mode between the B pole unit 3 and the material is point contact, line contact or surface contact. Point contact means that the A pole unit 2 or the B pole unit 3 is in point contact with the material, such as in a form of a pin head. Line contact means that the A pole unit 2 or the B pole unit 3 is in line contact with the material, such as in a form of a roller. Surface contact means that the A pole unit 2 or the B pole unit 3 is in surface contact with the material, such as in a form of a hammer plane. It should be noted that the contact modes of the A pole unit 2 and the B pole unit 3 with the material may be different contact modes respectively. For example, the A pole unit 2 is in line contact, and the B pole unit 3 is in point contact or the A pole unit 2 and the B pole unit 3 have the same contact mode.

In the present embodiment, when the temperature of the material does not need to be changed, both of the A pole unit 2 and the B pole unit 3 can be in contact with the material, or neither is in contact with the material, or one is in contact with the material, and the other is not in contact with the material, under the condition of ensuring that no energized circuit is formed when the temperature is not changed and both of the A pole unit 2 and the B pole unit 3 are in contact with the material. Then, in the whole process of temperature change of the material required by the object to be printed, the contact time of the A pole unit 2 and the B pole unit 3 with the material is continuous or intermittent. One of the A pole unit 2 and the B pole unit 3 can be in continuous contact, and the other is in intermittent contact, or both of the A pole unit 2 and the B pole unit 3 are in continuous contact, or in intermittent contact. Regardless of the contact mode, when the temperature is changed, the A pole unit 2 and the B pole unit 3 are ensured to be in contact with the material and an energized circuit is formed.

As an optional embodiment, the printing device of the present embodiment further comprises a feeding unit 7 which is connected with the calculation unit 1. The calculation unit 1 is used for determining an operating path of the feeding unit 7 according to the shape of the object to be printed; and the feeding unit 7 is used for moving according to the operating path and providing the material in the process of movement. Specifically, when a 3D object is printed, the object to be printed is modeled at first, and then the completed 3D model is partitioned to form a layer-by-layer cross section, that is, a plurality of slices are obtained. Thus, the operating path of the feeding unit 7 is determined according to the position relationship between each slice, and then the feeding unit 7 moves along the operating path and provides the material in the process of movement. Or, in the printing process, any path in space is used as the operating path according to the shape of the object to be printed directly, and then the feeding unit 7 moves along the operating path and provides the material in the process of movement. In the present embodiment, a motion platform can also be arranged, and is used to drive the feeding unit 7 to move. The motion platform may be a multi-degree-of-freedom or three-coordinate motion platform capable of movement and/or rotation, such as a mechanical arm. In addition, in the printing device provided in the present embodiment, the feeding unit 7 is adjusted to adjust the mass ratio of the phase change material and the conductive material.

It should be noted that the printing device in the present embodiment can also comprise a base; the feeding unit 7 provides the material for the base to realize the deposition of the material; and finally, the printed object is obtained. The printing device provided in the present embodiment can be used in the discharge process of the feeding unit 7, can also be used in the material located on the base, and can also be used for piecewise phase change or entire phase change for the material by using the A pole unit 2 and the B pole unit 3 after the discharge is completed.

As an optional embodiment, the printing device further comprises a cutting unit 8. The cutting unit 8 is communicatively connected with the calculation unit 1. The calculation unit 1 is used for controlling the cutting unit 8 according to the shape of the object to be printed to cut the material so that the shape of the cut object is the same as that of the object to be printed. The calculation unit 1 is also used for controlling the cutting unit 8 according to the shape of the object to be printed to cut the printed object, to obtain a printed product, and the shape of the printed product is the same as that of the object to be printed. That is, the cutting unit 8 in the present embodiment can be cut before the materials are combined, or cut after the materials are combined to form the printed object. In addition, the cutting unit 8 can also be connected with a motion platform which is used to drive the cutting unit 8 to move. The feeding unit 7 and the cutting unit 8 can be arranged integrally or separately.

It should be noted that in the present embodiment, the movement mode of contact of the A pole unit 2 and the B pole unit 3 with the material may comprise one or more of simultaneous contact, sequential contact and alternate contact. Simultaneous contact means that the A pole unit 2 and the B pole unit 3 simultaneously come into contact with the material. Sequential contact means that the A pole unit 2 and the B pole unit 3 come into contact with the material sequentially; for example, the A pole unit 2 makes contact firstly, and then the B pole unit 3 makes contact. Alternate contact means that the A pole unit 2 and the B pole unit 3 alternately come into contact with the material; the A pole unit 2 makes contact, the B pole unit 3 makes contact, the A pole unit 2 makes contact again, and so on. Regardless of the movement mode, a current circuit is formed when the A pole unit 2 and the B pole unit 3 are in contact with the material.

The printing device provided in the present embodiment deposits the material by forming the circuit through the A pole unit 2 and the B pole unit 3 with the material, to complete the combination. This combination mode saves cost, and is simple in structure, and stable and reliable. In addition, the voltage, the current and the resistance between the A pole unit 2 and the B pole unit 3 are set to be adjustable, to adjust the printing speed and facilitate the printing of different materials, which can realize the printing of objects of different shapes.

Embodiment 2

The present embodiment is used for providing a printing method, as shown in FIG. 2. The printing device in embodiment 1 is controlled to operate. The printing method comprises:

S1: controlling at least one electrode couple to be in contact with the material during material discharge to the forming of a printed object, to form an energized circuit, wherein the material is a phase change conductive material, or the material comprises a phase change material and a conductive material;

S2: using the energized circuit for energizing and heating the material, and making the surface temperature of at least the phase change material in the material greater than or equal to preset temperature, so that the material is combined until the printed object is obtained.

As an optional embodiment, the printing method further comprises an adjusting method for printing speed, specifically comprising:

adjusting voltage between the A pole unit 2 and the B pole unit 3 and resistance between the A pole unit 2 and the B pole unit 3;

or adjusting current between the A pole unit 2 and the B pole unit 3 and the resistance between the A pole unit 2 and the B pole unit 3;

or, adjusting the voltage between the A pole unit 2 and the B pole unit 3;

or, adjusting the current between the A pole unit 2 and the B pole unit 3;

or, adjusting the resistance between the A pole unit 2 and the B pole unit 3.

Each embodiment in the description is described in a progressive way. The difference of each embodiment from each other is the focus of explanation. The same and similar parts among all of the embodiments can be referred to each other.

Specific individual cases are applied herein for elaborating the principle and embodiments of the present invention. The illustration of the above embodiments is merely used for helping to understand the method and the core thought of the present invention. Meanwhile, for those ordinary skilled in the art, specific embodiments and the application scope may be changed in accordance with the thought of the present invention. In conclusion, the contents of the description shall not be interpreted as a limitation to the present invention.

What is claimed is:

1. A printing method comprising:
   discharging a material comprising carbon fiber coated with liquid epoxy resin;
   controlling at least one electrode pair to be in contact with the material during the step of discharging to form an electrical circuit comprising the electrode pair and the material, wherein the electrode pair comprises an electrode (A) and an electrode (B);
   generating, by the electrical circuit, an electrical current between the electrode (A) and the electrode (B) that passes through the carbon fiber to cause resistive heating of the carbon fiber until a surface temperature of the liquid epoxy resin coated on the carbon fiber is greater than or equal to a preset temperature, thereby causing the carbon fiber and the liquid epoxy resin to combine to form a printed object; and
   adjusting printing speed by adjusting any one of the voltage, the current and the resistance between the electrode (A) and the electrode (B);
   wherein, the adjustment of the resistance between the electrode (A) and the electrode (B) comprises adjusting a distance between the electrode (A) and the electrode (B) and/or adjusting a cross-sectional area of the electrically conductive material in between the electrode (A) and the electrode (B).

* * * * *